United States Patent
Agata et al.

[19]

[11] Patent Number: 6,064,566

[45] Date of Patent: May 16, 2000

[54] PERIPHERAL DEVICE FOR USE IN A COMPUTER AS AN INTERNAL AND EXTERNAL DEVICE

[75] Inventors: Hiroaki Agata, Yokohama; Yoshihisa Ishihara, Yamato, both of Japan

[73] Assignee: International Business Machines Corp., Armonk, N.Y.

[21] Appl. No.: 09/156,885

[22] Filed: Sep. 18, 1998

[30] Foreign Application Priority Data

Sep. 19, 1997 [JP] Japan ................................. 9-254451

[51] Int. Cl.[7] ........................................................ G06F 1/16
[52] U.S. Cl. ........................ 361/684; 361/685; 439/928.1
[58] Field of Search ................................... 361/685, 684; 439/928.1; 364/708.1

[56] References Cited

U.S. PATENT DOCUMENTS

| | | | |
|---|---|---|---|
| 4,769,764 | 9/1988 | Levanon | 364/708.1 |
| 4,941,841 | 7/1990 | Darden et al. | 361/685 |
| 5,211,566 | 5/1993 | Bates et al. | 361/685 |
| 5,729,478 | 3/1998 | Ma et al. | 364/708.1 |

*Primary Examiner*—Leo P. Picard
*Assistant Examiner*—John D. Reed
*Attorney, Agent, or Firm*—Douglas W. Cameron; Anne Vachon Dougherty

[57] ABSTRACT

To provide a peripheral device and a computer system, each being arranged to allow both of external and internal attachments of the peripheral device to the computer system such that, in case of the external attachment, the peripheral device can be attached to the computer system in a manner compatible with the conventional attachment method and yet it does not require any dedicated attachment device as before. A computer system 100 comprises a container 140 for containing a peripheral device 130 as an internal device, a cable 410 for attaching the peripheral device 130 to the system 100 as an external device, and a connector 434 for connecting the cable 410. Also, the peripheral device 130 has a connector 132 for internal attachment and a connector 310 for external attachment. When the peripheral device 130 is contained in the container 140, it is electrically connected to the system 100 and operates as a part thereof. Conversely, when the peripheral device 130 is used as an external device rather than an internal device, one end 412 of the cable 410 is connected to the connector 310 of the peripheral device 130 for external attachment, whereas the other end 414 of the cable 410 is connected to a connector 434 of the system 100. Thus, the externally attached peripheral device 130 is enabled to operate as a part of the system 100 for providing its function to a user in a manner similar to the above case of internal attachment.

14 Claims, 6 Drawing Sheets

PERIPHERAL DEVICE FOR USE IN A COMPUTER AS AN INTERNAL AND EXTERNAL DEVICE

FIELD OF THE INVENTION

This invention relates to an information processing apparatus and, more particularly, to a peripheral device that can be used as an internal (integrated) device and/or an external device for the information processing apparatus.

BACKGROUND OF THE INVENTION

With the technological revolution in these days, different types of personal computers (PCs), such as desktop type, tower type, notebook type or the like, have been developed and commercially available in the marketplace. Of these PCs, a notebook PC has been designed and manufactured to have a smaller size and a lighter weight, thereby to improve its mobility and portability.

Accordingly, in order to implement the aforesaid mobility/portability of a notebook PC as its features, it is mandatory to reduce the whole size and weight thereof. Also, since a notebook PC is a battery-operated device, it is required to reduce the overall power consumption, thereby to lengthen the continuously operable time after charging a battery. Hitherto, these features have been conventionally implemented by removing unnecessary functions from a desktop PC or a tower PC for selecting those functions to be installed on a notebook PC.

By way of example, some notebook PCs have had a limitation in that either a hard disk drive (HDD) or a floppy disk drive (FDD) can be selectively contained in its system unit as an internal drive for use therein. Namely, such a notebook PC is provided with a bay that is designed to contain either one of the HDD and FDD alone in its system unit. In another example, two different products, each having an internal HDD and an internal FDD respectively, are manufactured so that a user may select/purchase either one of these products.

Obviously, when a user carries a notebook PC for using it outside, there is no substantial problem of the prior approaches if either an HDD or an FDD is available to the user. However, when such a notebook PC is used in an office, its user may occasionally wish to use both of the HDD and FDD simultaneously. Also, the substantial increase of different products not only leads to the increase of costs but also an undesirable situation that prevents a user from upgrading his/her notebook PC during its use.

In FIG. 5, there is shown a prior solution to these problems. Shown in FIG. 5 is a method of connecting an internal FDD unit 520 that has been generally used in a conventional notebook PC. An internal bay 530 of the notebook PC is capable of selectively containing an internal storage device such as an HDD or an FDD. When the internal bay 530 is presently in use by another internal device such as an HDD, said FDD unit 520 that can be contained in the internal bay 530 may be externally attached (connected) to the notebook PC for use as its external device.

However, in such a case, it has been unable to directly attach FDD unit 520 to the notebook PC, since a connector 522 of FDD unit 520 and a connector 412 of a cable 410 for external attachment have different interfaces each other. Thus, it has been customarily required to provide an attachment means 510 for connecting the interface of the connector 522 to the cable 410 for external attachment. In other words, it is possible to externally attach FDD unit 520 to the notebook PC only when the attachment means 510 is so mounted as to embrace FDD unit 520. A connector 414 at another end of the cable 410 for external attachment is connected to a connector 420 of the notebook PC.

Another alternative approach for external attachment would be to newly design and manufacture a cable 530, as shown at a lower left portion of FIG. 5, which fits an connector 522 for internal attachment. However, such an approach is deemed disadvantageous in that there would be involved as much cost and time as the case of using said attachment means 510.

On the other hand, with respect to another type of a conventional notebook PC that has not any internal FDD, a dedicated FDD unit for external attachment (not shown) and its associated cable 410 have been widely available in the marketplace. In other words, because such a cable 410 for external attachment is readily obtainable at a lower price, there will be no substantial need to use said attachment means 510.

In Japanese Patent Publications H4-55918 and H4-55919, there is disclosed a technique for selectively containing either one of HDD and FDD in a portable type personal computer as its internal drive. However, in this technique, a dedicated housing for an HDD has to be used whenever an HDD is contained in the personal computer, whereas a dedicated housing for an FDD has to be used whenever an FDD is contained in the personal computer. While this technique enables to selectively change either one of HDD and FDD to the other at a factory level, it has a drawback that it does not allow a user to select an appropriate drive to be contained at one time or another. Besides, this technique has another drawback that a removable tray is additionally required for containing an HDD in the personal computer.

In another Japanese Patent Publication H3-142771, there is disclosed a similar technique for selectively containing either one of HDD and FDD in a portable type personal computer as its internal drive. However, this technique has a drawback that, in case of externally attaching an FDD to the personal computer, another HDD must be contained therein.

It is, therefore, an object of this invention to provide a peripheral device and a computer system, which are arranged to allow both of external and internal attachments of the peripheral device to the computer system. In case of the external attachment, this peripheral device is ideally attached to the computer system in a manner compatible with the conventional attachment method and does not require any dedicated attachment means.

It is another object of this invention to provide a computer system adapted for containing a plurality of different peripheral devices, which has a high degree of freedom for configuring these peripheral devices.

It is another object of this invention to provide a peripheral device and a computer system, which are arranged to allow both of external and internal attachments of the peripheral device to the computer system. In case of the external attachment, this peripheral device can be attached to the computer system in a manner compatible with the conventional attachment method by making use of an inexpensive and readily obtainable cable.

SUMMARY OF THE INVENTION

This invention has been made in view of said problems and its first aspect resides in a peripheral device for a computer system, said peripheral device being containable in a container means provided in a system unit of said computer system for containing said peripheral device, comprising: a first peripheral-side's connector for electrically connecting said peripheral device to said system unit in one state where said peripheral device is contained in said container means; and a second peripheral-side's connector for electrically connecting said peripheral device to said system unit in another state where said peripheral device is placed externally to said container means.

The second aspect of this invention resides in a computer system, comprising: a system unit; a peripheral device being removably connected to said system unit; a container means provided in said system unit for containing said peripheral device; a first system-side's connector provided in said container means; a first peripheral-side's connector provided on said peripheral device, the said connector being removably connected to said first system-side's connector; a second system-side's connector provided on said system unit at a place other than said container means; and a second peripheral-side's connector provided on said peripheral device, the said connector being removably connected to said second system-side's connector via a connection means.

BRIEF DESCRIPTION OF THE DRAWINGS

The invention will now be described in detail with reference to the appended drawings wherein.

DESCRIPTION OF THE PREFERRED EMBODIMENT

Figure 1:
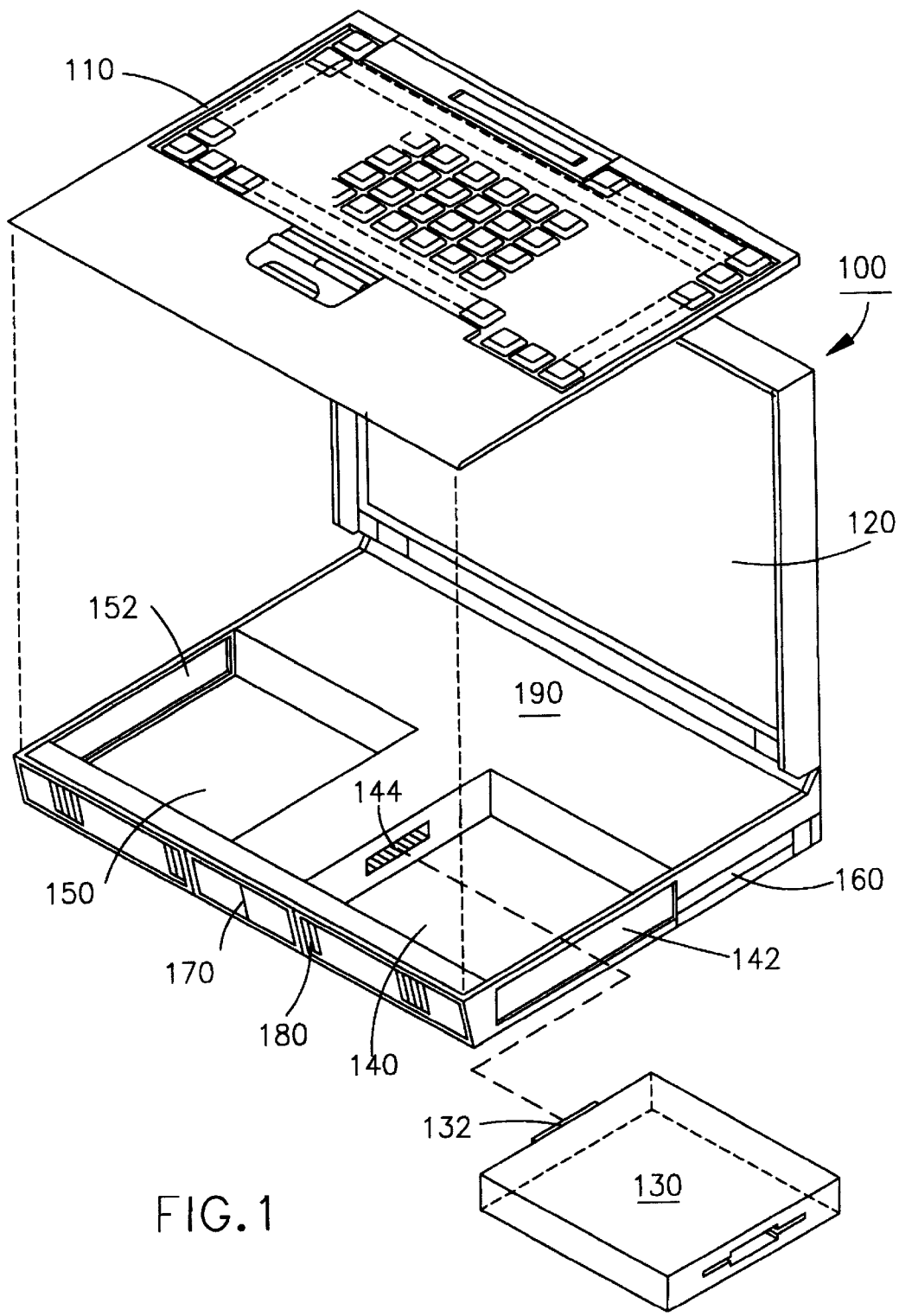
FIG. 1 is a schematic representation showing an overall configuration of a preferred notebook computer for use in this invention.

Now, with reference to the drawings, an embodiment of this invention will be described. In FIG. 1, there is shown an overall configuration of a notebook computer 100 relating to this invention, with a keyboard unit 110 conveniently removed to make its internal structure visible. The keyboard unit 110 is normally provided on an upper surface of a system unit 190 of the computer 100. The system unit 190 contains therein a mother board that has a CPU and a memory, peripheral controller chips, as well as a variety of peripheral devices including storage devices such as a hard disk drive (HDD) (not shown), a floppy disk drive (FDD) 130 and a CD-ROM drive (not shown). Also, a cover portion is pivotably hinged at a rear edge of the system unit 190. In this cover portion, a liquid crystal display (LCD) unit 120 of ten-odd inches in size is embedded.

In the system unit 190, there is provided a media bay 140 that can contain either one of storage media such as FDD 130, a CD-ROM drive and a DVD drive or a second battery as an internal device, in accordance with user's preference. This media bay 140 may be alternatively called "ultra bay".

By way of example, FDD 130 is ready for use as an internal device of the computer 100 whenever it is inserted from an entry 142 for the media bay 140 and attached to a connector 144 of the media bay 140. The media bay 140 has a status LED 180 for indicating status of a device attached to the media bay 140 and an eject lever 170 for removing a device attached to media bay 140.

Also, the system unit 190 is provided with a battery bay 150 that has a mechanism similar to the media bay 140 and is adapted for containing a battery or the like, as well as an entry 152 for receiving/removing a battery. Similar to the media bay 140, this battery bay 150 has a status LED 180 for indicating status of an attached battery and an eject lever 170.

Figure 2:
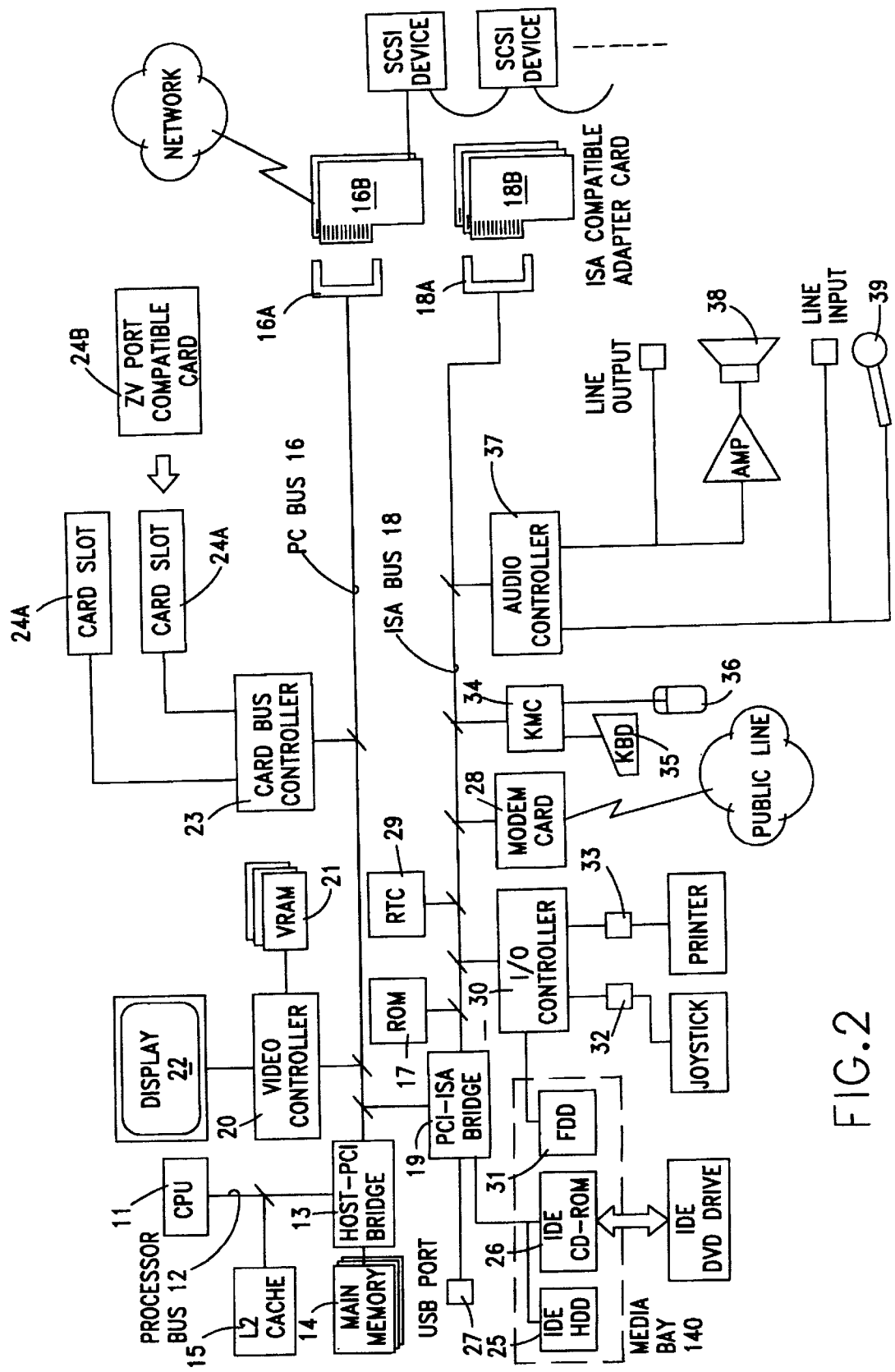
FIG. 2 a block diagram showing a hardware configuration of a preferred notebook computer for use in this invention.

In FIG. 2, there is schematically shown a hardware configuration of a typical notebook computer (PC) 100. An example for implementing this invention is a type of PC, which conforms to the specification of OADG (PC Open Architecture Developer's Group) and incorporates an operating system (OS) such as "Windows95" of Microsoft Corp. or "OS/2" of IBM Corp.

CPU 11, acting as a main controller, executes a variety of programs under the control of OS. CPU 11 may be a CPU chip called "Pentium" or "MMX Technology Pentium" made by Intel Corp. CPU 11 interconnects with each hardware block (to be described) through a hierarchical bus structure of three levels, which comprises a processor bus 12 directly coupled to its own external pins, a PCI (Peripheral Component Interconnect) bus 16 as a local bus and an ISA (Industry Standard Architecture) bus 18.

Processor bus 12 and PCI bus 16 are interconnected by a bridge circuit (host-PCI bridge) 13. This bridge circuit 13 comprises a memory controller for controlling access operations to a main memory 14, a data buffer for absorbing a speed difference between both buses 12 and 16.

Main memory 14 is a writable memory used as read-in areas or working areas of executed programs. In general, main memory 14 comprises a plurality of DRAM (dynamic RAM) chips such that its basic capacity is typically 32 MB and extendable up to 256 MB. The executed programs include an OS such as "Windows95", each device driver for operating peripheral equipment as hardware and a variety of application programs.

L2-cache 15 is a high speed memory for absorbing access time to the main memory 14 and is used for temporarily storing limited code and data to be frequently accessed by CPU 11. In general, L2-cache 15 comprises SRAM chips and its typical capacity is 512 KB.

PCI bus 16 is a type of bus that enables transfer of data at a relatively high rate (bus width: 32/64 bits, maximum operating frequency: 33/66 MHz, maximum data transfer rate: 132/264 MBps), and is used for connecting relatively fast PCI devices such as a video controller 20 and a card bus controller 23. As is well known in the art, the PCI architecture is based on the proposal of Intel Corp. and implements the so-called "PnP" (Plug and Play) function.

The video controller 20 is a dedicated controller for actually processing drawing instructions from CPU 11. In operation, it temporarily stores the processed drawing information into a screen buffer (VRAM) 21, reads the drawing information from VRAM 21, and provides the same as a video output to a liquid crystal display (LCD) or a CRT display 22.

The card bus controller 23 is a dedicated controller for directly coupling those bus signals on PCI bus 16 to an interface connector (card bus) in a PC card slot 24A. Insertable into this PC card slot 24A is a PC card 24B, which conforms to the industry standard (e.g., "PC Card Standard 95") defined by PCMCIA (Personal Computer Memory Card International Association)/JEIDA (Japan Electronic Industry Development Association). As types of PC card 24B, there are a LAN card for connection to a network, an integrated HDD card as an external storage device, a SCSI (Small Computer System Interface) card for connection to an external SCSI device, and the like.

PCI bus 16 and ISA bus 18 are interconnected by a bridge circuit (PCI-ISA bridge) 19. This bridge circuit 19 is constructed to contain a DMA controller, a programmable interrupt controller (PIC) and a programmable interval timer (PIT). DMA controller is a dedicated controller for executing a data transfer between a peripheral device (e.g., FDD 31) and main memory 14 without intervention of CPU 11. The programmable interrupt controller (PIC) is a dedicated controller that is responsive to an interruption request (IRQ) from a peripheral device for causing a predetermined processing program (interrupt handler) to be executed. The programmable interval timer (PIT) is an apparatus for generating timer signals (normally, in the form of square waves) at predetermined frequencies, which are programmable.

Also, the bridge circuit 19 is provided with an IDE interface for connecting external storage devices, which conform to the IDE (Integrated Drive Electronics). To this IDE interface, an IDE hard disk drive (HDD) 25 and an IDE CD-ROM drive 26 may be connected by means of ATAPI (AT Attachment Packet Interface). In place of IDE CD-ROM drive 26, another type of an IDE device such as a DVD (Digital Video Disc) drive may be connected. External storage devices such as HDD 25 and/or CD-ROM drive 26 are contained at a certain place in the computer 100, which may be called "media bay" or "device bay". These external storage device as standard features may be mounted interchangeably and exclusively with another device such as an FDD and/or a battery (in the case of notebook PC).

HDD 25 is better than another external storage device in terms of its access rate. Accordingly, by copying software programs (e.g., OS, applications) onto disks of HDD 25 (i.e., by "installing" them), these programs are ready for use by the computer 100. CD-ROM drive 26 is capable of reproducing a music CD (CD-DA data) and reading computer data (CD-ROM data). This is convenient for installing software programs provided in the form of a CD-ROM into the computer 100. The DVD drive is a device for handling a DVD as a type of optical discs, which comprises a DVD-ROM drive and a DVD-RAM drive. A data transfer rate of the DVD drive is comparable to that of a 10× speed CD-ROM drive. A DVD is a medium adapted for storing a variety of materials including but not limited to images, and it has a capacity of 4.7 GB (comparable to images and sounds for 133 minutes) on a single surface.

Further, the bridge circuit 19 has a USB route controller for connecting a USB (Universal Serial Bus) as a general purpose bus, as well as a USB port 27. USB supports the "Hot Plugging" function for allowing a new peripheral device (USB device) to be attached/detached while its power is turned on, in addition to the "Plug and Play" function for automatically recognizing a newly connected peripheral device and for performing re-setup of the system configuration. To a single USB port, a maximum of sixty three USB devices can be connected in a daisy chain fashion. Examples of USB devices are a keyboard, a mouse, a joystick, a scanner, a printer, a modem, a display monitor, a tablet, etc.

ISA bus 18 has a slower data transfer rate than PCI bus 16 (bus width: 16 bits, maximum data transfer rate: 4 Mbps) and, thus, it is used for connecting relatively slower peripheral devices such as a ROM 17, a modem card 28, a real time clock (RTC) 29, an I/O controller 30, a keyboard/mouse controller (KMC) 34 and an audio controller 37.

ROM 17 is a non-volatile memory, which permanently stores code groups (BIOS: Basic Input/Output System) for controlling I/O operations of respective hardware components such as a keyboard 35 and FDD 31, in addition to a POST (Power On Self Test) program or the like.

Modem card 28 is a device for transmitting computer data in a digital form via an analog telephone line. It includes a signal processing circuit (modem chip) for modulating transmission data and for demodulating received data, as well as other circuit components such as a data access arrangement (DAA) circuit for connecting the modem to a public line in accordance with the line switching standards for each locale.

RTC 29 is a device for measuring the current time-of-day. In general, RTC 29 is mounted on a single chip with a CMOS memory (not shown). Typically, this CMOS memory is used for temporarily storing critical information to security/safety of the computer 100 such as system configuration information (setup value of BIOS) and a power on password. RTC/CMOS 29 is backed up by a back up battery (normally a coin battery: not shown) so that the measured/stored contents are not lost even after the computer 100 goes to its power-off state.

I/O controller 30 is a peripheral controller for controlling operations of FDD 31, I/O operations of parallel data (PIO) via a parallel port 32, and I/O operations of serial data (SIO) via a serial port 33. A printer may be connected to the parallel port 32, whereas a joystick may be connected to the serial port 33.

KMC 27 is a dedicated controller for capturing input scan codes from the keyboard 28, or input coordinate values from a pointing device (mouse 36 or a track point) as computer data. Audio controller 37 is a dedicated controller for performing I/O processing of audio signals, and it includes a CODEC (COder-DECoder: an AD/DA converter having a mixing function) for recording/reproducing audio signals in a digital form. Audio signals may be received as voice signals from a microphone 39, or as a line input from an external audio equipment (not shown). Conversely, generated audio signals may be provided as a line output to an external audio equipment (not shown), or as outputs from a speaker 38 after amplified at an audio amplifier. Audio controller 37 may be constructed in accordance with the industry standards "AC 97", defined by Analog Device, Inc., Creative Labs, Inc., Intel Corp., National Semiconductor Corp., and Yamaha Corp.

At one end of the buses 16 and 18, at least one PCI bus slot 16A and at least one ISA bus slot 18A may be provided respectively. To these bus slots 16A and 18A, a PCI compatible adapter card 16B and an ISA compatible adapter card 18B may be mounted respectively. one example of the adapter cards is a LAN card for connecting the computer 100 to a network, and another example is a SCSI card for connecting to a variety of SCSI devices including an HDD, a CD-ROM drive, a DVD drive and a printer.

A typical user of the computer 100 operates the system through keyboard 35 or mouse 36 to execute various application programs such as a word processing program, a spreadsheet program and a communication program so that the executed result is useful for accomplishing his/her work on the display screen.

General purpose personal computers commercially available in the current marketplace will sufficiently function as the computer 100 shown in FIG. 2. It is apparent that additional electronic circuits or the like other than those shown in FIG. 2 are required to construct the computer 100. However, these components are not described in the present specification, since they are well known in the art and yet they do not pertain to the gist of this invention. Also, it should be understood that for brevity of the drawings, only a portion of the connections between the illustrated hardware blocks is shown.

To summarize the above, FIGS. 1 and 2 schematically show the media bay 140 (ultra bay) as a port for attaching various external storage devices. As examples of these external storage devices attached to this media bay 140, FIG. 2 further shows CD-ROM drive unit 26, HDD unit 25 and FDD unit 130. It should be understood here that peripheral devices attachable to the media bay 140 are not limited to these devices, but may be any one of another storage device, communication device, battery or the like so far as the said device conforms to the interface standards of media bay 140.

Figure 3:
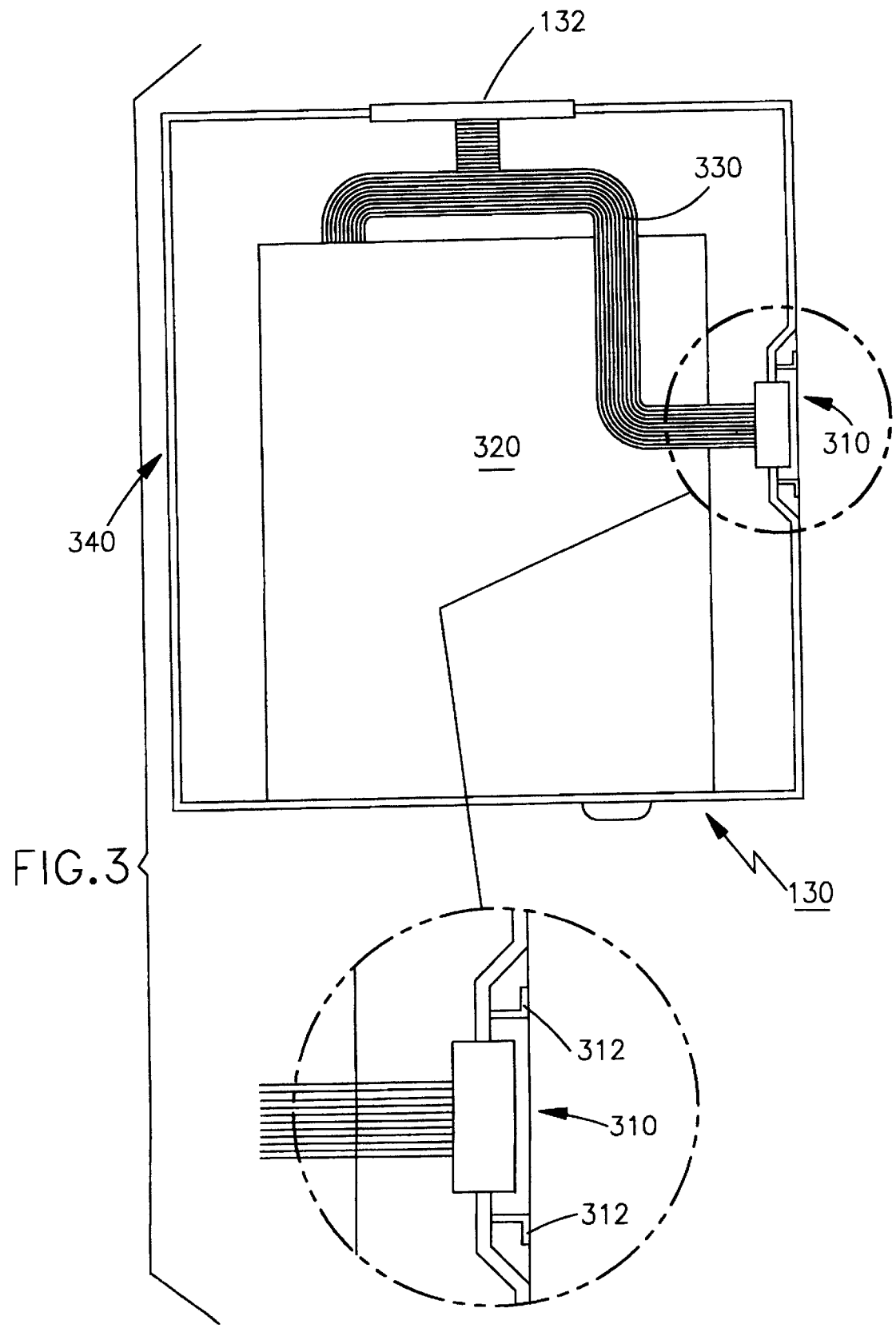
FIG. 3 is a schematic representation showing an internal structure of a floppy disk drive (FDD) unit in a preferred embodiment of this invention.

In FIG. 3, there is shown an internal structure of FDD unit 130 relating to this invention. This FDD unit 130 comprises an FDD 320, a connector 132 for attaching FDD 320 to the media bay 140 of the computer 100, a connector 310 for connecting FDD 320 to a cable 410 for external attachment (see FIG. 4), a cable 330 for interconnecting FDD 320, the connector 132 and connector 310 respectively, and an exterior housing 340 for fixing the foregoing elements in its inside. The connector 310 may further comprise a lock mechanism (latch) 312 that is designed to prevent the cable 410 for external attachment from being detached.

FDD 320 has electronic components and an interface circuit for implementing read/write functions of a floppy disk, whereas this interface circuit is connected to both connectors 132 and 310 via the cable 330. While said FDD 320, connectors 132 and 310 are simply interconnected by the cable 330 in this embodiment, it may be necessary to provide an interface conversion circuit between FDD 320 and both connectors 132, 310 depending on the nature of interfaces supported by these connectors 132, 310. The cable 330 may be a coaxial cable, a flat cable, a flexible substrate, etc.

Figure 6:
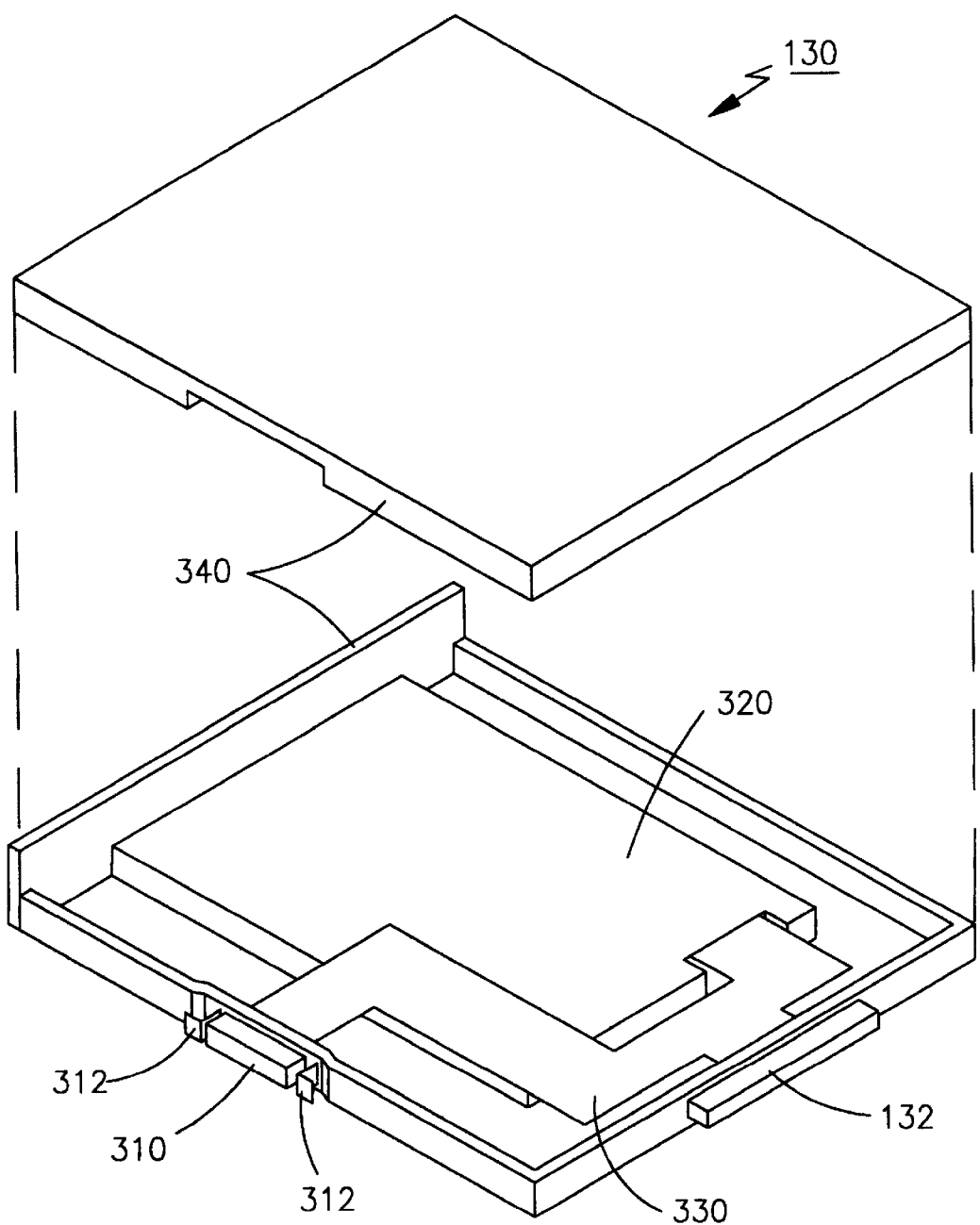
FIG. 6 is a perspective view showing a connector structure of a floppy disk drive (FDD) unit in a preferred embodiment of this invention.

FIG. 6 is a perspective view showing a connector structure of FDD unit 130 in a preferred embodiment of this invention. In this drawing, a positional relationship between the two connectors 132 and 310 in the embodiment of FIG. 3 is shown in more detail. The connector 132 is used for internal attachment, whereas the connector 310 is used for external attachment. The connector 132 or 310 may comprise the lock mechanism 312.

In place of aforesaid cable 310 shown in FIG. 3, a flexible substrate 330 as a connection means is shown in FIG. 6. While the connector 132 and 310 are shown in FIGS. 3 and 6 to be provided on different surfaces of FDD unit 130, they may be provided on the same surface. However, when an excessively large area is required for attaching both connectors 132 and 310, they will have to be provided on two different surfaces respectively. Also, when FDD 320 is presently in use as an external device, it is possible to protect its presently unused connector 132 for internal attachment by means of a protection cover (not shown). Also, such a protection cover may be formed to function as a leg of FDD unit 130.

Figure 4:
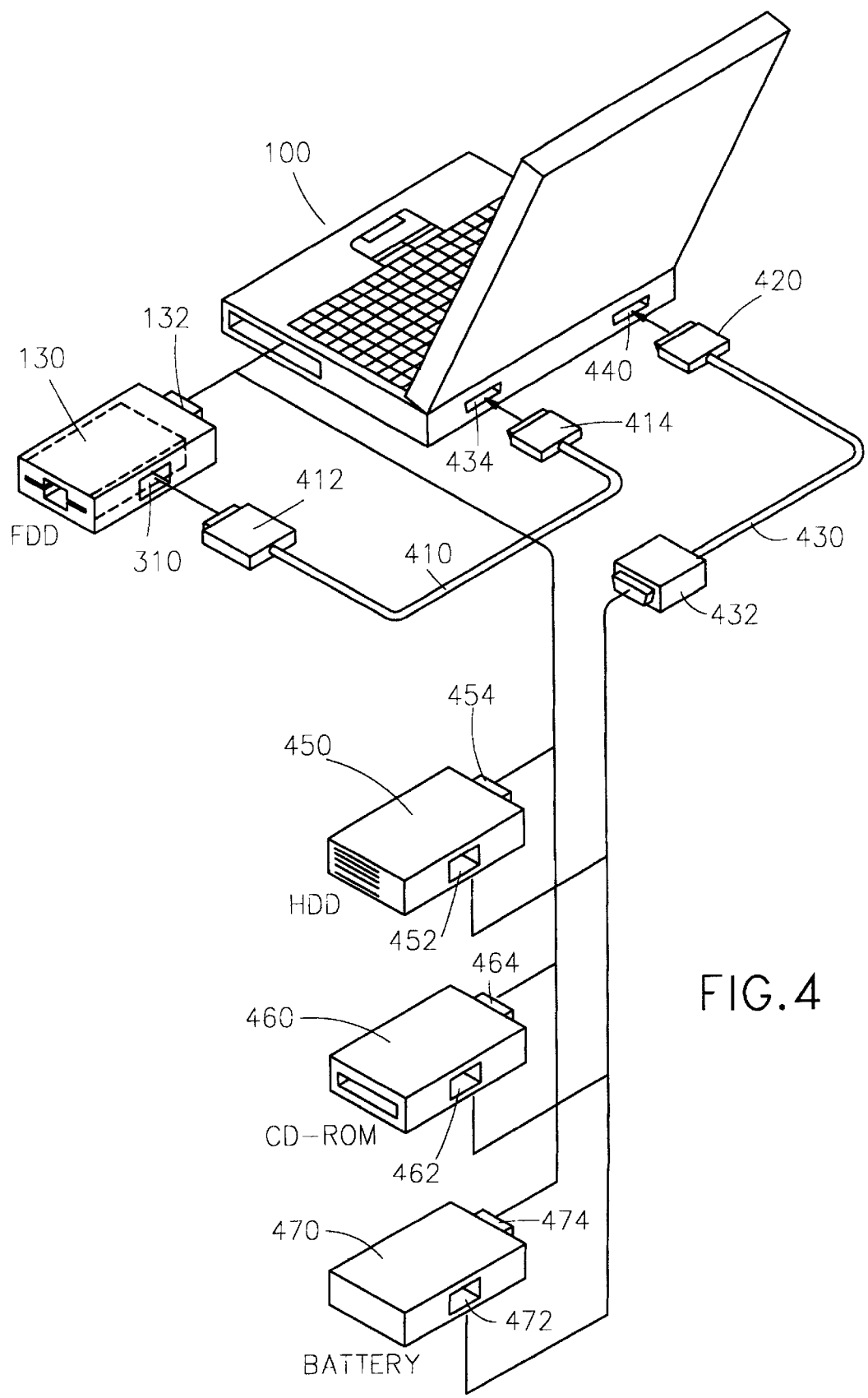
FIG. 4 is a diagram showing a method of connecting a floppy disk drive (FDD) unit and a notebook computer in a preferred embodiment of this invention.
Figure 5:
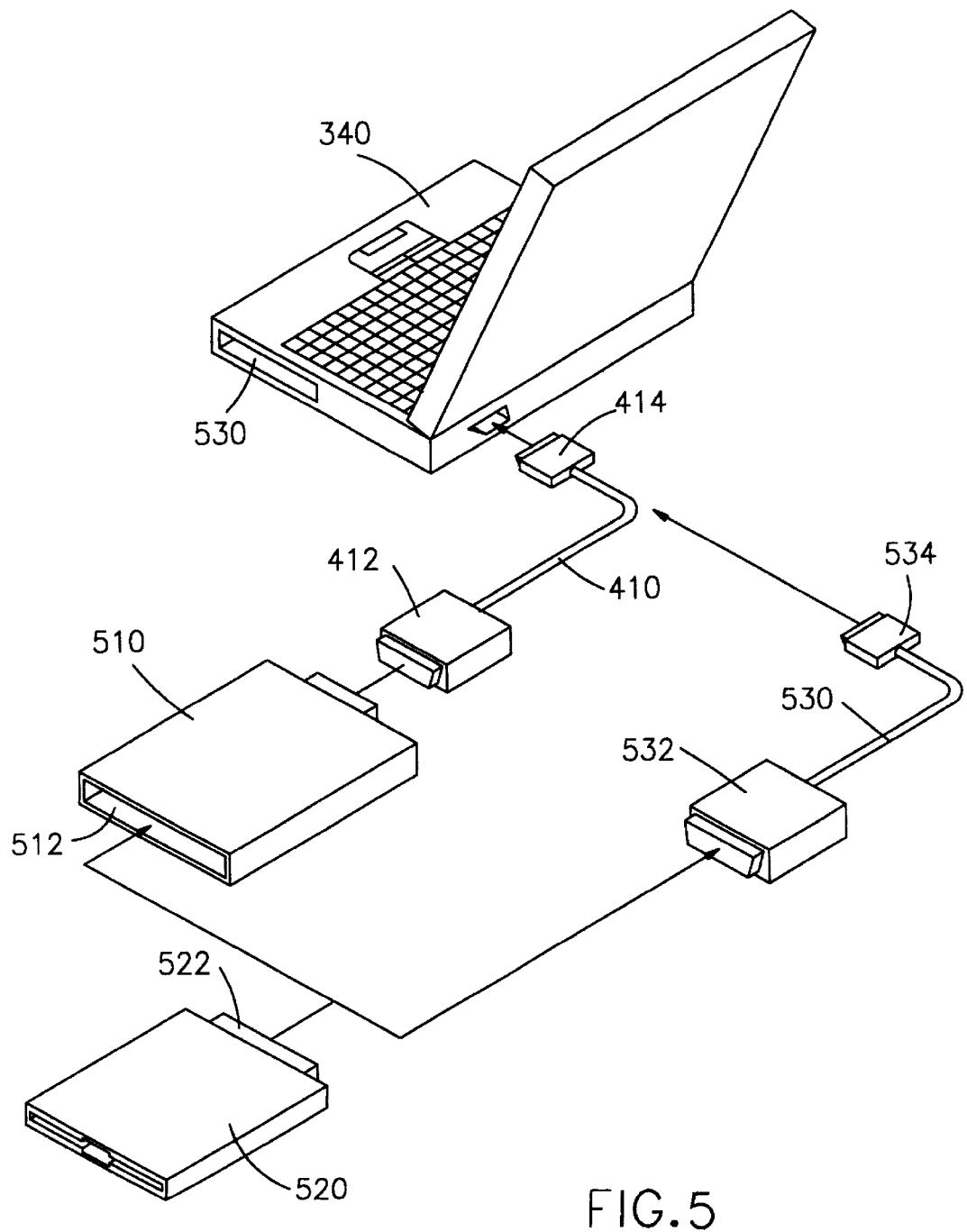
FIG. 5 a diagram showing a conventional method of connecting a floppy disk drive (FDD) unit and a notebook computer.

In FIG. 4, there are shown two different connection states of FDD unit 130 shown in FIG. 3 or the like and the computer 100 respectively. First, when FDD unit 130 is to be used as an internal device, it is inserted from an entry 142 for the media bay 140 and attached to a system unit of the computer 100 using the connector 132 for internal attachment.

On the other hand, when the media bay 140 is presently in use by another internal device such as CD-ROM drive unit 460 or the like, FDD unit 130 is attached to the computer 100 via a cable 410 for external attachment connected to the connector 310 for external attachment. One end 412 of this cable 410 is connected to the connector 310 provided on FDD unit 130 for external attachment, whereas another end 414 of this cable 410 is connected to a connector 434 provided on the computer 100 for external FDD unit. Thus, externally attached FDD unit 130 is enabled to operate as a part of the computer 100 in a manner similar to the above case where FDD unit 130 is contained in the media bay 140 as an internal device. Note in this respect that no special component such as an attachment means as before is required even for such external attachment.

Further, when either one of HDD unit 450, CD-ROM drive unit 460 and battery unit 470 is to be used as an internal device, instead of FDD unit 130, anyone of these units 450, 460 and 470 is inserted from the entry 142 for the media bay 140 and attached to a system unit of the computer 100 using its associated connector 454, 464 or 474 for internal attachment in the same manner as described above with respect to FDD unit 130.

When the media bay 140 is presently in use by another internal device, either one of HDD unit 450, CD-ROM drive unit 460 and battery unit 470 is attached to the computer 100 via an externally attaching cable 430 connected to its associated connector 452, 462 or 472 for external attachment. One end 432 of this cable 430 is connected to the connectors 452, 462 and 472 provided on these respective units for external attachment, whereas another end 420 of this cable 430 is connected to a port 440 for USB, an expansion bus or SCSI of the computer 100. Thus, an externally attached unit 450, 460 or 470 is enabled to operate as a part of the computer 100 in a manner similar to the above case where such a unit is contained in the media bay 140 as an internal device. Note in this respect that no special component such as an attachment means as before is required even for such external attachment.

The invention has been described with reference to several specific embodiments. One having skill in the relevant art will recognize that modifications may be made without departing from the spirit and scope of the invention as set forth in the claims.

Having thus described our invention, what we claim as new and desire to secure by Letters Patent is:

1. A peripheral device for a computer system, said peripheral device being containable in a container means provided in a system unit of said computer system for containing said peripheral device, comprising:

a first peripheral-side's connector electrically connecting said peripheral device to said system unit in one state where said peripheral device is contained in said container means; and a second peripheral-side's connector electrically connecting said peripheral device to said system unit in another state where said peripheral device is placed externally to said container means.

2. The peripheral device for a computer system as set forth in claim 1, wherein said first and second peripheral-side's connectors are mounted on mutually different surfaces of said peripheral device respectively.

3. The peripheral device for a computer system as set forth in claim 1, wherein said second peripheral-side's connector has a lock means preventing a connection means connected to the said connector from being detached therefrom.

4. The peripheral device for a computer system as set forth in claim 1, wherein at least one of said first and second peripheral-side's connector further comprises a protection cover protecting the said connector when the said connector is not in use.

5. A computer system, comprising:

a system unit;

a peripheral device removably connected to said system unit;

a container means provided in said system unit connectable to said peripheral device;

a first system-side's connector provided in said container means;

a first peripheral-side's connector provided on said peripheral device, the said connector removably connectable to said first system-side's connector;

a second system-side's connector provided on said system unit at a place other than said container means; and a second peripheral-side's connector provided on said peripheral device, the said connector removably connectable to said second system-side's connector via a connection means.

6. In a computer system that is capable of containing a peripheral device connected thereto by a first connection means in a removable manner, the improvement comprising:

said peripheral device connectable to said computer system via a second connection means.

7. The computer system as set forth in claim 6, wherein said second connection means comprises a cable.

8. The computer system as set forth in claim 6, wherein said peripheral device is a floppy disk drive.

9. The computer system as set forth in claim 6, wherein said peripheral device is a hard disk drive.

10. The computer system as set forth in claim 6, wherein said peripheral device is a DVD drive.

11. A computer system, comprising:

a system unit; and a peripheral device having a first connector and a second connector, said first connector usable in one state where said peripheral device is contained in said system unit, and said second connector usable in another state where said peripheral device is externally connected to said system unit, whereby said peripheral device is connected to said system unit via either one of said first and second connectors.

12. The peripheral device for a computer system as set forth in claim 1, wherein said first peripheral-side's connector and said second peripheral-side's connector are connected to a single cable within said peripheral device.

13. The peripheral device for a computer system as set forth in claim 5, wherein said first peripheral-side's connector and said second peripheral-side's connector are connected to a single cable within said peripheral device.

14. The peripheral device for a computer system as set forth in claim 11, wherein said first connector and said second connector are connected to a single cable within said peripheral device.

* * * * *